United States Patent [19]
Watts, Jr.

[11] Patent Number: 5,968,173
[45] Date of Patent: Oct. 19, 1999

[54] METHOD AND SYSTEM FOR MAXIMIZING THE APPARENT INITIAL PROCESSING CAPABILITY OF A COMPUTER

[75] Inventor: LaVaughn F. Watts, Jr., Temple, Tex.

[73] Assignee: Texas Instruments Incorporated, Dallas, Tex.

[21] Appl. No.: 08/942,230

[22] Filed: Oct. 1, 1997

[51] Int. Cl.$^6$ ................................................ G06F 9/445
[52] U.S. Cl. .............................................................. 713/2
[58] Field of Search ............................... 713/1, 2, 100; 395/651, 652, 653

[56] References Cited

U.S. PATENT DOCUMENTS

| 5,307,497 | 4/1994 | Feigenbaum et al. | 395/651 |
| 5,692,143 | 11/1997 | Johnson et al. | 345/339 |
| 5,710,930 | 1/1998 | Laney et al. | 710/10 |

*Primary Examiner*—Dennis M. Butler
*Attorney, Agent, or Firm*—Ronald O. Neerings; Robby T. Holland; Richard L. Donaldson

[57] ABSTRACT

A method and system (50) reduce the apparent time between turning on a computer (10) and making available the computer (10) processing capability. The method and system (154) include the necessary steps for and instructions and circuitry for generating a startup command for the computer. The method and system include displaying within a shortened predetermined time period an interface screen (14) that includes a plurality of interface checkpoints (24) and address data relating to application programs associated with the user interface checkpoints. The shortened predetermined time period has a duration substantially shorter than the period associated with booting (60) the associated application programs. In turning off computer (10), the method and system (50) include generating a shut down command (70) to computer (10) and storing interface screen (14) and any data files (78) that are open at the time of turning off computer (10). The interface screen (14) and data files are stored so that upon subsequently turning on computer (10), computer (10) displays interface screen (14) in the shortened predetermined time.

25 Claims, 3 Drawing Sheets

METHOD AND SYSTEM FOR MAXIMIZING THE APPARENT INITIAL PROCESSING CAPABILITY OF A COMPUTER

TECHNICAL FIELD OF THE INVENTION

The present invention relates to the operation of computer systems, and more particularly to a method and system for reducing the apparent time between turning on a computer and making available processing capability.

BACKGROUND OF THE INVENTION

As desktop and notebook computing systems have become increasingly complex, capable of performing multimedia applications, communicating on networks, and displaying varied and multi-dimensional images, the type and number of software programs that the computer must boot or initialize to become operable have dramatically increased. In addition, the software for many different types of peripherals, including hard drives, CD-ROM devices, printers, facsimile, and other peripheral software that a computer must initialize adds yet another level of complexity to computer operation. Known methods for starting a computer that include all of these many software programs consume as much as two, three, and four minutes from the time that a user first activates the computer's power button or switch.

Computer users, however, desire to have computers operate like a calculator. That is, they desire the computer to operate immediately after being turned on. With today's computers, however, this is not possible, because a computer must, prior to being operational, operate BIOS software and initialize hardware devices drivers to associate hardware peripherals the central processor unit.

User's also desire to have a computer that can be immediately shut down. This cannot happen with today's computers, because of the need to close the many files that may have been open during the computer's operation. In fact, computer users desire to simply press a key on the computer keyboard and have the computer immediately go to a shutdown condition.

There have been some attempts to achieve this level of operation by establishing a hibernate mode of operation for the central processing unit. This hibernate mode of operation, while operating the computer in a reduced mode of operation, still requires that the central processing unit have some applied power. Whereas this may not be a problem for desktop computers, this mode of operation is not practical for notebook computers.

A first limitation of a hibernate mode of operation derives from the fact that the central processing unit still must draw power. Because notebooks operate from battery power, the hibernate mode of operation depletes the battery power source.

Another limitation of a hibernate mode of operation comes from the fact that the central processing unit still operates during this mode, albeit at a minimal level of operation. Federal Aviation Administration (FAA) regulations prohibit the passenger use of electronic devices during aircraft takeoff and landing due to the electromagnetic frequency (EMF) emissions from these electronic devices. Even though the central processing unit of a notebook or laptop computer may be operating at a lower rate during the hibernate mode, EMF emissions still occur in violation of the FAA regulations. Accordingly, the hibernate mode of operation is not practical for notebook computer operation during air travel.

Still another limitation of the hibernate and similar modes of operation is that these modes of operation assume that all applications and data files are to be saved to the computer's hard drive. This assumes a sufficient amount of storage on the hard drive. In addition, the hibernate mode of operation assumes that the user only desires to restore to operation those files that were saved upon entering the hibernate mode.

There is, therefore, no known way to effectively eliminate the wait period of making computers, whether they are desktop or notebook computers, available to users.

SUMMARY OF THE INVENTION

The present invention provides a method and system for maximizing the apparent initial processing capability of a computer that eliminates the overhead or wait period for processing capable computers in terms of how quickly the use perceives the computer being able to process data for the user.

According to one aspect of the present invention, there is provided a method and the associated computer instructions and circuitry for reducing the apparent time between turning on a computer and making available the computer processing capability. The method includes the steps of generating a startup command for the computer. The method also includes the steps of displaying within a shortened predetermined time period an interface screen that includes a plurality of interface checkpoints and address data relating to application programs associated with the interface checkpoints. The shortened predetermined time period has a duration substantially shorter than the period associated with booting the associated application programs. Thereafter, the method includes the step of booting the associated application programs in response to the displaying step.

Another aspect of the present invention is a method and associated computer instructions and circuitry for turning off a computer so that a subsequent turning on of the computer achieves a reduction of the apparent time between turning on the computer and making available the computer's processing capability. The method includes the steps of generating a shut down command to the computer. The shut down method further includes the steps of storing an interface screen and any data files that are open at the time of turning off the computer. The interface screen includes a plurality of interface checkpoints and address data relating to application programs associated with the plurality of interface checkpoint. The interface screen and the data files are stored so that upon turning on the computer, the computer displays the interface screen in a shortened predetermined time. The shortened predetermined time has a duration substantially shorter than the duration for booting the associated application programs. Finally, the shut down aspect of the method includes shutting down the computer.

A technical advantage of the present invention is that the user does not need to go through the computer's BIOS and boot system instructions to get the interface screen. The interface screen appears essentially instantaneously. Moreover, the interface screen operates as a boot screen for booting or initializing the application programs associated with the interface checkpoints. As a result, the present invention provides an "instant on" capability to the user that makes a computer appear to operate essentially immediately upon the user turning on the computer. As a result, the time to return to desired computer system operation is significantly shorter than that required to restart the computer's BIOS and to re-boot the computer system.

Another technical advantage of the present invention is that it provides a way for the user to initially save the interface screen to whatever device he selects. The user controls the saving of this screen. This allows the user to have control over the interface checkpoints and the associated data. Once the interface checkpoints are selected, the user may still vary them according to the selected memory device. The selected memory device for storing the interface screen, as well as the plurality of interface checkpoints and associated data provides additional flexibility.

The above and other technical advantages of the present invention will become apparent to ordinary persons skilled in the art upon a reading and understanding of the following detailed description of illustrative embodiments and associated drawings.

BRIEF DESCRIPTION OF THE DRAWINGS

The present invention is best understood upon a reading of the detailed description of illustrative embodiments when viewed together with the following drawings wherein common reference numerals refer to like and corresponding elements, and further wherein:

FIGS. 1a through 1c depict a notebook computer using one embodiment of the present invention;

DETAILED DESCRIPTION OF ILLUSTRATIVE EMBODIMENTS

Figure 1C:
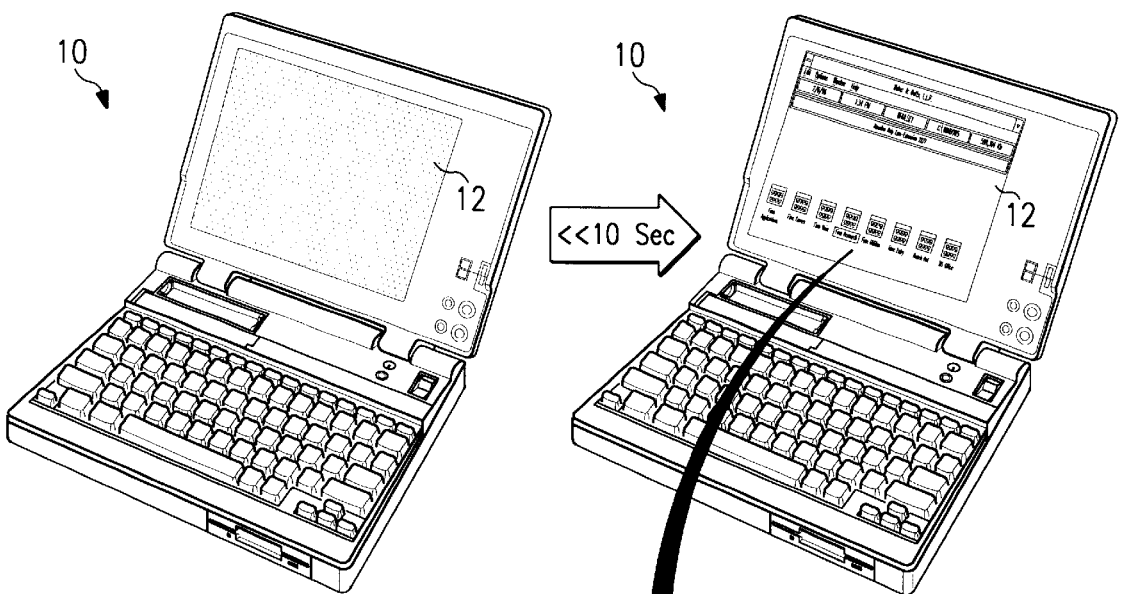
Figure 1C:
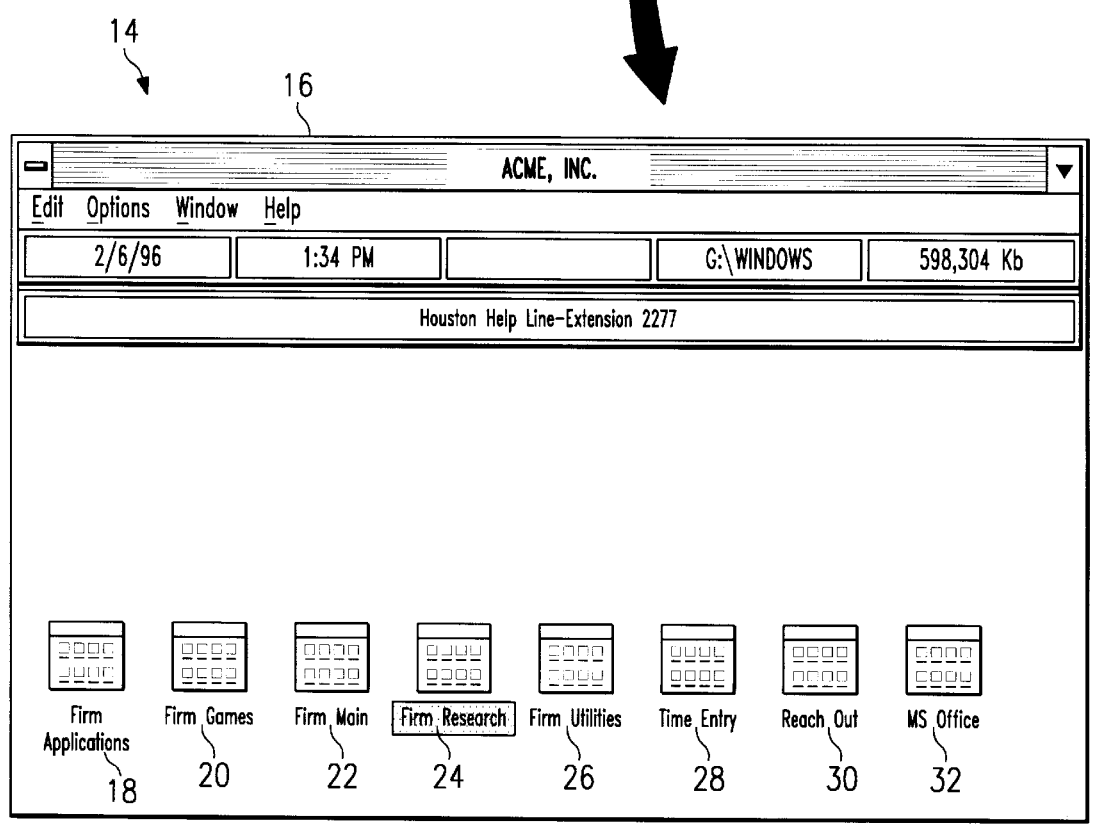

FIG. 1a shows notebook computer 10 in an initial off state, such that no image appears on screen 12. In implementing the present embodiment of the invention, FIGS. 1b and 1c show notebook computer 10 that on screen 12 appears interface screen 14 that includes Windows toolbar 16 and interface checkpoints 18 through 32. Interface checkpoints 18 through 32 have the appearance of icons for the various application programs or sets of application programs that may operate on notebook computer 10. The appearance of interface screen 14 occurs, as far as the user is concerned, immediately after energizing notebook computer 10. This may occur in much less than ten (10) seconds, for example. In the present embodiment, the computer preferably does not operate BIOS software or initialize the hard drive or to otherwise conduct initialization routines prior to displaying interface screen 14. These operations occur, instead, after interface screen 14 and associate interface checkpoints 18 through 32 first appear on the computer screen.

Figures 2A, 2B:
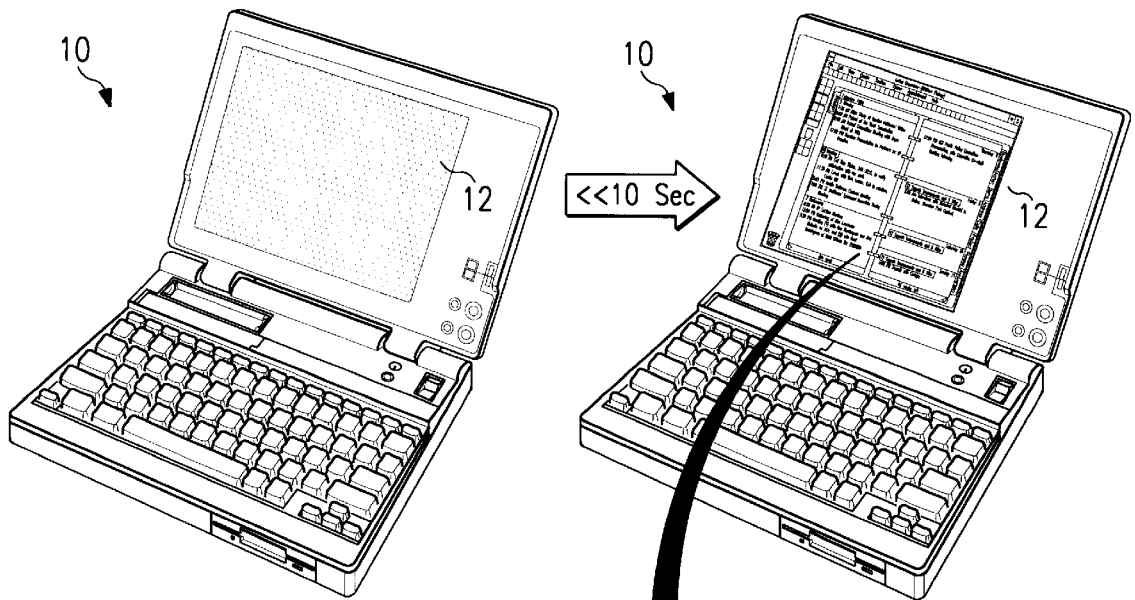
FIGS. 2a through 2c show a notebook computer incorporating another embodiment of the invention.

FIG. 2a, like FIG. 1a shows notebook computer 10 that includes monitor 12, in its off state. FIG. 2b shows the initialized state of notebook computer 10, but with the modified interface screen 40. Modified interface screen 40, instead of being the Windows toolbar screen, shows a daily planner for the user as the interface screen. Interface screen 40 shows datebook 42 as the initial interface screen. The interface checkpoints may be displayed to the user or operate in the background for the purpose of initializing the associated application programs that the user desires to have available. For example, with modified interface screen 40 and daily planner screen 42, interface checkpoints could initially be various icons 44 that associate with the application programs of the computerized scheduler or organizer system. Other application programs, such as electronic mail or E-mail, billing and accounting systems, and other computer systems may be appropriate for initialization through the organizer program.

Figure 2C:
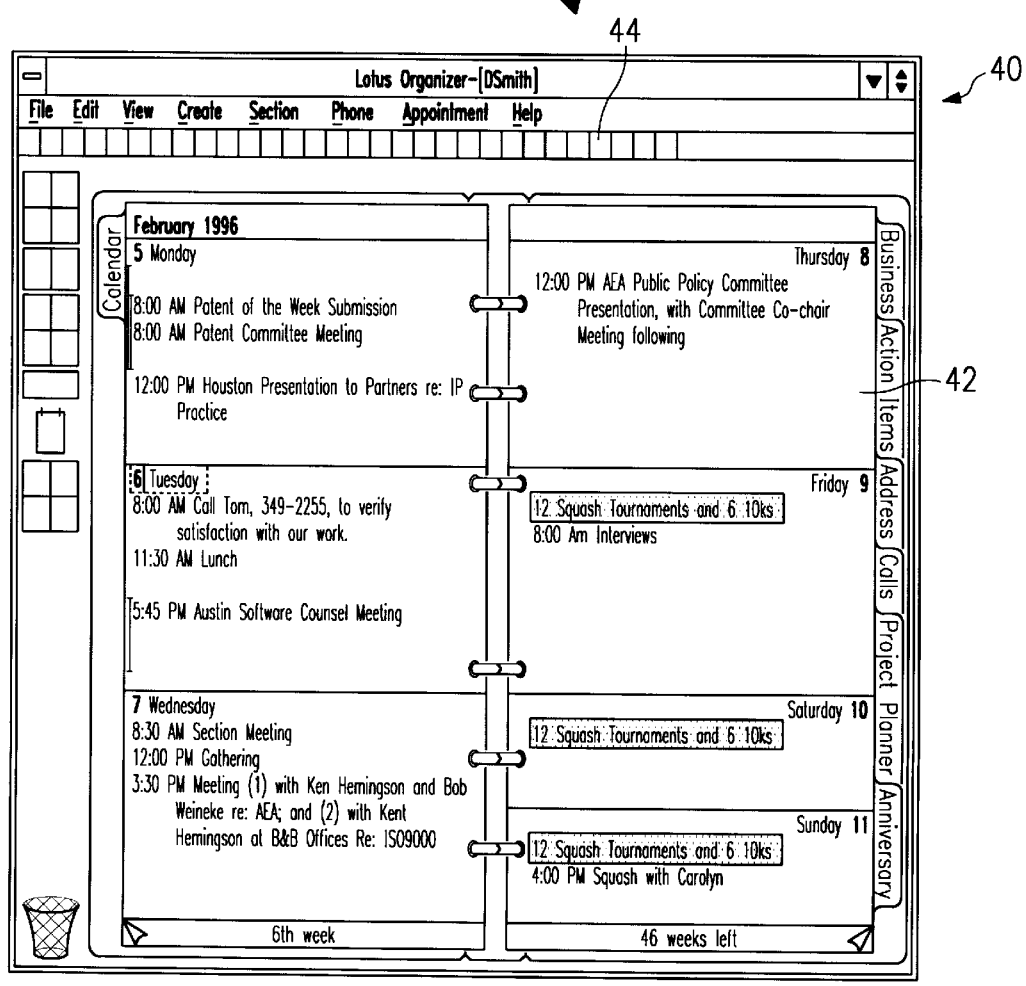
Figure 3:
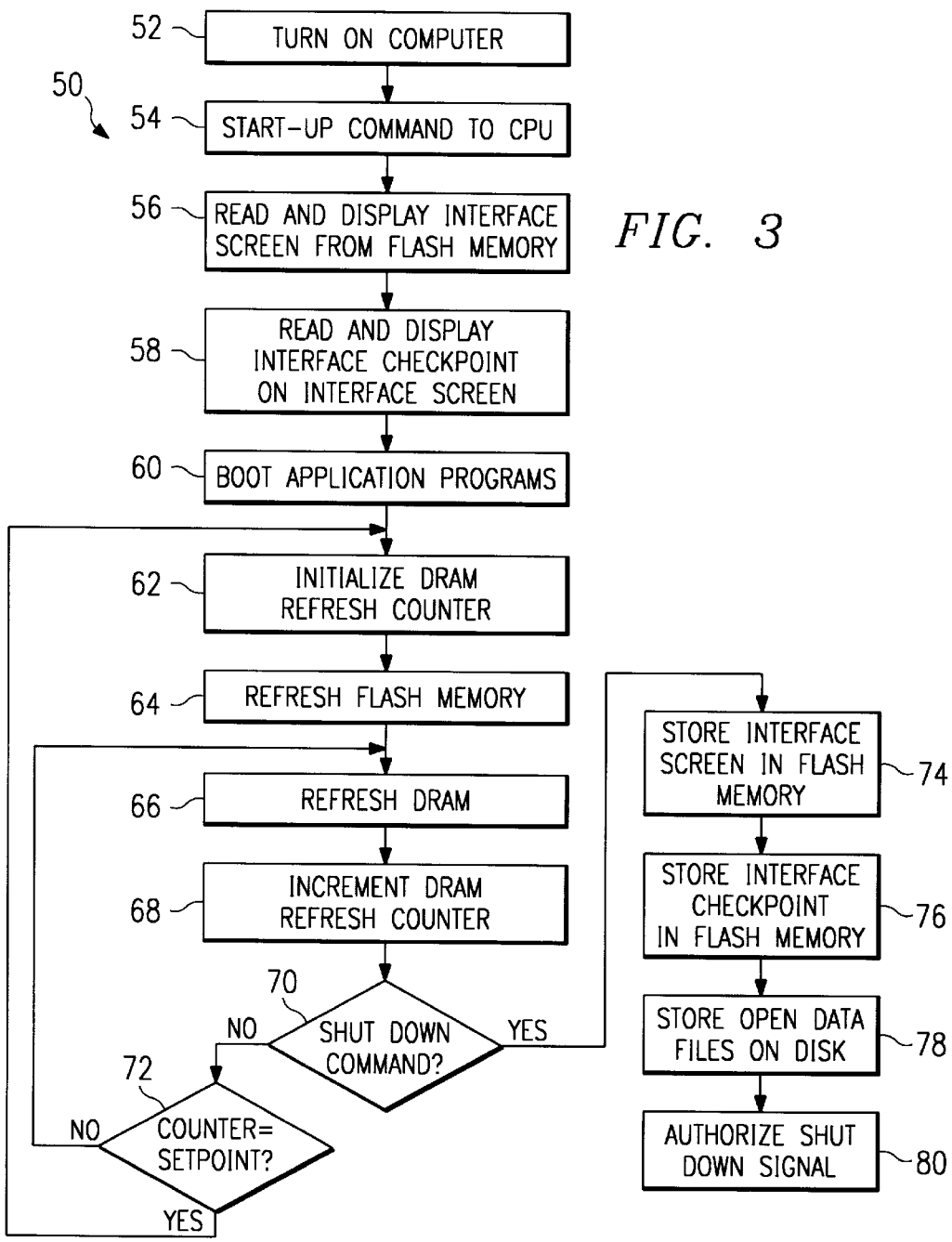
FIG. 3 presents a flowchart describing operations of one embodiment of the present invention.

FIG. 3 illustrates one embodiment for operating notebook computer 10 to achieve purposes of the present invention. Process flow diagram 50 may begin, for example, at step 52 wherein notebook computer 10 is first turned on by a user, for example. After being turned on at step 54, a start-up command is generated at the computer's CPU. Step 56 relates to the step of reading and displaying interface screen 14 (of FIG. 1c), or 40 (of FIG. 2c), for example, from a memory device such as a flash memory device. Step 58 describes the step of reading and displaying the interface checkpoints, such as interface checkpoints 18 through 32 on interface screen 14. Next, after displaying the interface checkpoints, step 60 describes the step of booting or initializing the application programs associated with the particular interface checkpoints. Step 62 describes the step of initializing the dynamic random access memories within notebook computer 10. The next step, as step 64 depicts, shows refreshing the flash memory. Step 64 illustrates the step of refreshing the associated DRAM. Then, step 68 shows incrementing the DRAM refresh counter after which query 70 tests whether notebook computer 10 has received a shutdown command from the user. If not, process flow goes to query 72 to test whether the counter value equals a predetermined set point value. If not, program flow goes back to refresh DRAM step 66. On the other hand, if the counter equals the predetermined set point, process flow goes to step 62 to initialize the DRAM refresh counter and, thereafter, refresh the flash memory at step 64.

If query 70 determines that the shutdown command has been received, process flow goes to step 74 for storing interface screens 14 in flash memory. Next, in step 76, interface checkpoints 18 through 32, for example, are stored in the flash memory. Step 78 also depicts the step of storing open data files on a hard disk. Finally, at step 80, an authorize shutdown response goes to the user at which point the user can turn off notebook computer 10.

In one embodiment of the invention, a flash memory stores the interface screen and associated data. Storing the interface screen in flash memory has the added advantage of not having to expend the power or take the time to initialize the hard disk. This also saves the power that booting the hard drive expends.

Because the storage command directs the interface screen and open data files into flash memory, several technical advantages arise. However, the flash memory capacity for saving the interface screen and the open data files, is preferably of sufficient size to store the normal system flash memory requirements, as well as the interface screen and associated overhead files. Realize, however, that simply from operating the computer, the amount of overhead memory capacity is determinable. The amount necessary for storing the interface screen is within the capacity of typical flash memory. There is, therefore, at least the need to match the amount of screen memory required for the interface screen. This amount of additional flash memory could, for example, be placed on a PCMCIA card.

Figure 4:
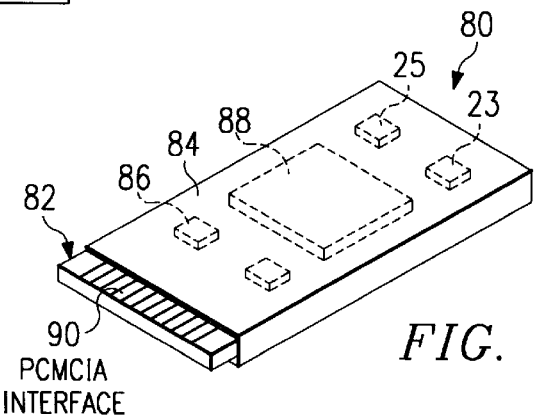
FIG. 4 illustrates a PCMCIA card that may implement one embodiment of the present invention.

In still another embodiment of the present invention, the interface screen and a user's pre-designated interface checkpoints are stored in a flash memory of a PCMCIA card along with any data files the user desires. The PCMCIA card is removable from the computer and insertable in a notebook or portable computer. For this purpose, FIG. 4 shows one embodiment of PCMCIA card 80 that includes PCMCIA interface connectors 82. PCMCIA interface connectors 82 connect to circuitry on PCMCIA card circuitry 84. PCMCIA circuitry 84 may include additional flash memory 86 and other circuitry 88 that may include DRAM circuitry. By virtue of adding additional flash memory 86, the present embodiment stores the interface checkpoints required for notebook computer 10 to access and present interface screen 14.

To achieve the necessary connections, PCMCIA interface connector 82 includes one or more additional flash memory pins 90 that connect between the installed flash memory of notebook computer 10 and flash memory 86 of PCMCIA card 80. With such a configuration, a user may move not only data files from one computer to another, but also the interface screen and the particular interface checkpoints that were pre-selected. Consequently, the user has the ability to move a complete processing environment with an "instant on" capability from one computer to another.

A further embodiment of the present invention permits a memory card to include a flash memory for storing the interface screen. The flash memory occupies a standard DRAM address and the memory card includes additional pins for flash memory addressing. The additional flash memory address pins may tie into the address that is decoded right by the standard base ROM-flash memory address system. With this configuration, the central processing unit's flash memory address circuitry receives information that there is additional flash memory in the memory card. In turning off the computer using the method and system of the present invention, the central processing unit writes the interface checkpoint data to the additional flash memory of the memory card for the purpose of accommodating the additional DRAM of the memory card.

The alternative embodiment, therefore, includes two separate memory addresses and corresponding data flow paths. There is the control path for memory to the DRAM for updating the DRAM. There is also the flash memory address and corresponding data flow path. For every predetermined period, such as every fifteen minutes, for example, in addition to storing information in the DRAM, the alternative embodiment stores the same information that goes to the DRAM in the flash memory, including the flash memory of the associated memory card. Of course, storage to DRAM occurs according the DRAM's particular refresh cycle. Storage to flash memory occurs according to the flash memory cycle of an associated counter. This can occur, for example, by the associated counter cycling every fifteen minutes, for example. At the beginning of each cycle, the timer starts to count down to zero. At zero, the storage of information goes not only to DRAM, but also to flash memory.

With this structure, when the user depresses a suspend key on the computer keyboard, the computer stores the interface checkpoints in an unneutralized flash. The computer saves the interface screen and the data to the interface screen area in the flash memory. The flash memory stores all of the information on the interface screen, the status of the interface screen, including the interface checkpoints, the status of the central processing unit registers, the status of all hardware, as well as all other information needed to be fully functional. On the other hand, all that is stored is the image on the screen and the particular address information. All other files are on the computer's hard drive and are in a shut down status, unless already opened. For the opened data files, storage occurs. Saving the data that is opened does take time, this amount of time is small compared to that required to initialize the computer's hard drive.

Upon starting the computer, the interface screen and the preselected interface checkpoints are immediately taken from flash memory and displayed to the user. Within much less than ten seconds, the data files that were opened are available to the user. The result is that the computer processing ability appears to be immediately available to the user.

Even for computers that use virus-checking algorithms that operate upon energizing the computer. Because the interface screen and the associated open data files are all saved in a state in which they were originally operating at the time of turning off the computer, there is not the need to check this information for viruses. Consequently, the virus-checking algorithms need not delay making the interface screen available to the user.

Data files that are open can be stored in the hard drive. While this may slow down the shut down procedure, the resulting computer system shut down operation is significantly faster that if the hard drive satisfies all memory requirements for shut down. Moreover, upon turning on the computer, only the information in the flash memory is necessary to very rapidly display to the user the interface screen and the various interface checkpoints. Shortly thereafter, the hard drive is operational and the previously open data files are available. The result is that the user perceives essentially immediate access to all of the operability that he experienced at the time of the previous shut down.

A technical advantage of the present invention is that it provides a shorter path to an initial interface screen on a computer than has heretofore been possible in the event that a disk sector is bad or data is not being processed properly by the computer. With the present invention, there is no need to re-boot the computer. Instead, the user may simply return to the interface screen and initialize one or more of the interface checkpoints that activate corresponding application programs. As a result, time to return to desired computer system operation is significantly shorter than that required to restart the computer's BIOS and to re-boot the computer system.

Another technical advantage of the present invention is that it provides a way for the user to initially save the interface screen to whatever device he selects. The user controls the saving of this screen. This allows the user to have control over the interface checkpoint and the associated data. In fact, the user may select that the interface screen be other than a traditional Windows or Windows'95 user interface screen. For example, the user may select that the interface screen be that of a daily planner, such as a Lotus Organizer user interface screen. From such a screen, the various desired interface checkpoints may be selected.

Once the interface checkpoints are selected, the user may vary them according to the selected memory device. The selected memory device for storing the interface screen, as well as the plurality of interface checkpoints and associated data provides additional flexibility. The user may also vary the number and type of interface checkpoints.

In the background, the computer may be configured to restore the various numbers and types of interface checkpoints and their associated open data file addresses. By storing the interface checkpoints and associated open data file addresses, the present embodiment assures that if a loss of operation occurs, or if the user selects to go into a hibernate mode, that upon restoring operation or leaving the hibernate mode, that the interface checkpoints are the same as before.

In summary, therefore, the present embodiment provides a method and system for reducing the apparent time between turning on a computer and making available processing capability. The method includes the steps of and the system includes the necessary instructions for generating a startup command for the computer and displaying within a shortened predetermined time period an interface screen. The interface screen includes a plurality of interface checkpoints. The interface checkpoints include at least one user interface checkpoint and address data relating to application programs associated with the user interface checkpoints. The shortened predetermined time period has a duration substantially shorter than the period associated with booting the associated application programs. On start up, the method also includes the step of booting the associated application programs in response to said displaying step.

On turning off the computer, in summary, the present embodiment includes the method of and instructions and circuitry for turning off a computer so that a subsequent turning on achieves a reduction on the apparent time between turning on the computer and making available processing capability. The present method and system includes generating a shut down command to the computer and storing an interface screen and any data files that are open at the time of turning off the computer. The interface screen and data files are stored so that upon subsequently turning on the computer, the computer displays the interface screen in a shortened predetermined time that is of a duration substantially shorter than the duration for booting the associated application programs. After storing the interface screen with its interface checkpoint, and the open data files, the present invention shuts down the computer.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true copies of the invention.

What I claim is:

1. A method for reducing the apparent time between turning on a computer and making available the computer processing capability, said method comprising the steps of:
   (a) generating a startup command for the computer;
   (b) displaying within a shortened predetermined time period an interface screen comprising a user interface checkpoint and address data, said address data relating to application programs associated with said user interface checkpoint, said shortened predetermined time period having a duration substantially shorter than the period required for booting the associated application programs; and
   (c) booting said associated application programs in response to said displaying step.

2. The method of claim 1, further comprising the step of retrieving said interface checkpoint and said address data from a flash memory.

3. The method of claim 1, further comprising the step of retrieving said interface checkpoint and said address data from a flash memory, said flash memory forming part of an adapter card that is separate from the main computer processing board.

4. The method of claim 1, further comprising the step of bypassing at least a portion of the BIOS instructions of the computer establishing the normal operating state of the computer in retrieving said interface checkpoint.

5. The method of claim 1, further comprising the step of retrieving said interface checkpoint as a user-selected interface corresponding to a predetermined application program interface.

6. A method for turning off a computer so that in subsequently turning on the computer, a reduction occurs in the apparent time between turning on the computer and making to a user the available computer processing capability, said turning off method comprising the steps of:
   (a) generating a shut down command to the computer
   (b) storing an interface screen and any data files that are open at the time of turning off the computer, said interface screen comprising a plurality of interface checkpoints comprising at least one user interface checkpoint and address data relating to application programs associated with said at least one user interface checkpoint, said interface screen and said data files stored so that upon turning on the computer, the computer displays the interface screen in a shortened predetermined time, said shortened predetermined time having a duration substantially shorter than the duration for booting the associated application programs; and
   (c) shutting down the computer.

7. The method of claim 6, further comprising the step of storing said interface checkpoint and said address data in a flash memory.

8. The method of claim 6, further comprising the step of storing said interface checkpoint and said address data from a flash memory, said flash memory forming part of an adapter card that is separate from the main computer processing board.

9. The method of claim 6, further comprising the step of bypassing at least a portion of the BIOS instructions of the computer establishing the shutdown state of the computer in storing said interface checkpoint.

10. The method of claim 6, further comprising the step of storing said interface checkpoint as a user-selected interface corresponding to a predetermined application program interface.

11. A method for operating a computer to reduce the apparent time between turning on a computer and making available processing capability, said computer operating method comprising the steps of:
   upon turning on the computer:
      (a) generating a startup command to the computer;
      (b) displaying within a shortened predetermined time period an interface screen comprising a plurality of interface checkpoints comprising at least one user interface checkpoint and address data relating to application programs associated with said at least one user interface checkpoint, said shortened predetermined time period having a duration substantially shorter than the period associated with booting the associated application programs; and
      (c) booting said associated application programs in response to said displaying step; and
   upon turning off the computer:
      (a) generating a shut down command to the computer;
      (b) storing an interface screen and any data files that are open at the time of turning off the computer, said interface screen comprising a plurality of interface checkpoints comprising at least one user interface checkpoint and address data relating to application programs associated with said at least one user interface checkpoint, said interface screen and said data files stored so that upon turning on the computer, the computer displays the interface screen in a shortened predetermined time, said shortened predetermined time having a duration substantially shorter than the duration for booting the associated application programs; and (c) shutting down the computer.

12. The method of claim 11, further comprising the steps of retrieving and storing said interface checkpoint and said address data from a flash memory.

13. The method of claim 11, further comprising the steps of retrieving and storing said interface checkpoint and said address data from a flash memory, said flash memory forming part of an adapter card that is separate from the main computer memory.

14. The method of claim 11, further comprising the step of bypassing BIOS instructions establishing the operating and shutdown state of the computer in retrieving and storing said interface checkpoint.

15. The method of claim 11, further comprising the step of retrieving said interface checkpoint as a user-selected interface corresponding to a predetermined application program interface.

16. A system for reducing the apparent time between turning on a computer and making available the computer processing capability, said system comprising:

(a) instructions for generating a startup command for the computer according to a predetermined input;

(b) an interface screen comprising a user interface checkpoint and address data, said interface screen for displaying within a shortened predetermined time period, said address data relating to application programs associated with said user interface checkpoint, said shortened predetermined time period having a duration substantially shorter than the period required for booting the associated application programs; and (c) instructions booting said associated application programs in response to said displaying step.

17. The system of claim 16, further comprising a flash memory associated with the computer and instructions for retrieving said interface checkpoint and said address data from said flash memory.

18. The system of claim 16, further comprising a flash memory associated with the computer and instructions for retrieving said interface checkpoint and said address data from said flash memory, said flash memory forming part of an adapter card that is separate from the main computer memory.

19. The system of claim 16, further comprising instructions for bypassing at least a portion of the BIOS instructions of said computer in retrieving said interface checkpoint.

20. The system of claim 16, further comprising the instructions for retrieving said interface checkpoint as a user-selected interface corresponding to a predetermined application program interface.

21. A system for turning off a computer so that in subsequently turning on the computer, a reduction occurs in the apparent time between turning on the computer and making to a user the available computer processing capability, said turning off method comprising the steps of:

(a) instructions for generating a shut down command to the computer in response to a predetermined input;

(b) a memory device for storing an interface screen and any data files that are open at the time of turning off the computer, said interface screen comprising a plurality of interface checkpoints comprising at least one user interface checkpoint and address data relating to application programs associated with said at least one user interface checkpoint, said interface screen and said data files stored so that, upon turning on the computer, the computer displays the interface screen in a shortened predetermined time, said shortened predetermined time having a duration substantially shorter than the duration for booting the associated application programs; and (c) instructions for shutting down the computer in response to storing said interface screen and any open data files.

22. The system of claim 21, further comprising a flash memory and instructions for storing said interface checkpoint and said address data from said flash memory.

23. The method of claim 21, further comprising a flash memory and instructions for storing said interface checkpoint and said address data from said flash memory, said flash memory forming part of an adapter card that is separate from the main computer memory.

24. The system of claim 21, further comprising instructions for bypassing at least a portion of BIOS instructions of the computer in storing said interface checkpoint.

25. The system of claim 21, further comprising instructions for storing said interface checkpoint as a user-selected interface corresponding to a predetermined application program interface.

* * * * *

UNITED STATES PATENT AND TRADEMARK OFFICE
CERTIFICATE OF CORRECTION

PATENT NO. : 5,968,173
DATED : October 19, 1999
INVENTOR(S) : LaVaughn F. Watts, Jr.

It is certified that error appears in the above-identified patent and that said Letters Patent is hereby corrected as shown below:

On the title page: Item [60] Provisional Application No: 60/027,727, filed October 1, 1997.

Column 1, line 4, insert the following:

--Cross Reference to Related Application Reference is made to to and priority claimed from U.S. Provisional Application No. 60/027,727, filed 10/01/96--.

Signed and Sealed this

Twenty-fifth Day of April, 2000

Attest:

Q. TODD DICKINSON

*Attesting Officer*  *Director of Patents and Trademarks*